INVENTOR.
EDWARD E. JUDGE
BY Farley, Forster & Farley
ATTORNEYS

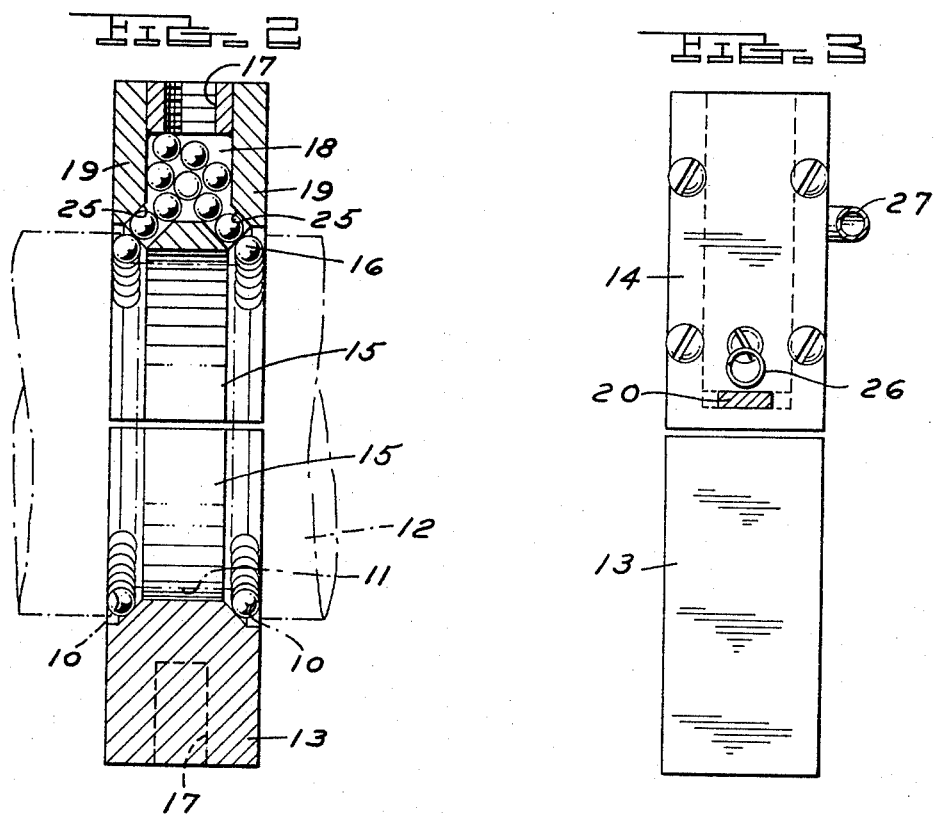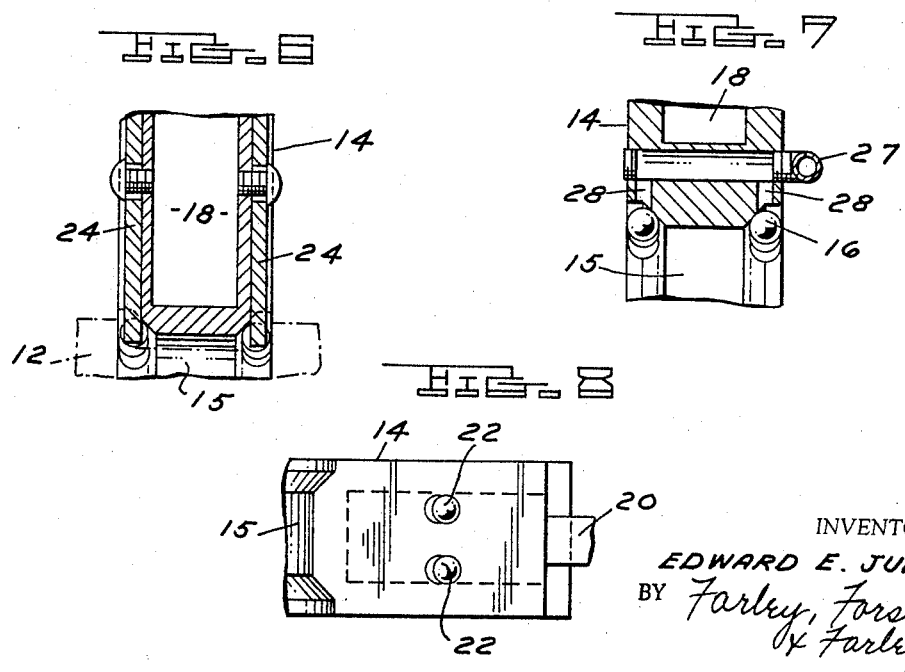

United States Patent Office 3,267,551
Patented August 23, 1966

3,267,551
BALL TRACK BURNISHING DEVICE
Edward E. Judge, Lansing, Mich., assignor to Industrial Metal Products Corporation, Lansing, Mich., a corporation of Michigan
Filed Sept. 19, 1963, Ser. No. 310,089
6 Claims. (Cl. 29—90)

This invention relates to a ball track burnishing device and more particularly to a unit adapted to burnish shoulder radii adjacent cylindrical bearing surfaces of shafts, such as automotive crankshafts, axles, steering knuckles, front wheel spindles, transmission shafts, and other similar applications where high bearing and torque loads are apt to lead to fatigue failures starting with minute irregularities or cracks in shoulder radii.

The benefits of burnishing main bearing areas in greatly increasing fatigue life of highly stressed shafts has long been recognized but attempts to extend such beneficial effects to shoulder radii through conventional roll burnishing techniques have to date been largely unsuccessful. The present invention provides for the burnishing of radii through the rolling of balls of suitable diameter under pressure directly against corner radii as the shaft is rotated within the burnishing unit which comprises shoes with split race having annular angular shoulders in opposed relation to the shaft's radii with suitable interference spacing when burnishing balls are present to produce the desired burnishing action under rotation of the shaft. The balls are led into the intermediate space between shaft radii and race shoulders after the shoes are closed to operating position providing, in effect, a full ball bearing relationship and such balls are retracted from the space prior to opening the shoes. The means by which the balls are introduced and retracted as well as other objects of the invention may best be understood from the following detailed description of a preferred embodiment of the ball track burnishing unit as illustrated in the drawings wherein:

FIG. 2 is a sectional elevation taken along the line 2—2 of FIG. 1;

FIG. 3 is an elevation taken along the line 3—3 of FIG. 1;

FIG. 6 is a fragmentary sectional view of a ball return stop taken along the line 6—6 of FIG. 1;

FIG. 7 is a fragmentary sectional view of air passages taken along the line 7—7 of FIG. 1; and FIG. 8 is a fragmentary view of the upper shoe ball passages taken along the line 8—8 of FIG. 1.

Figure 1:
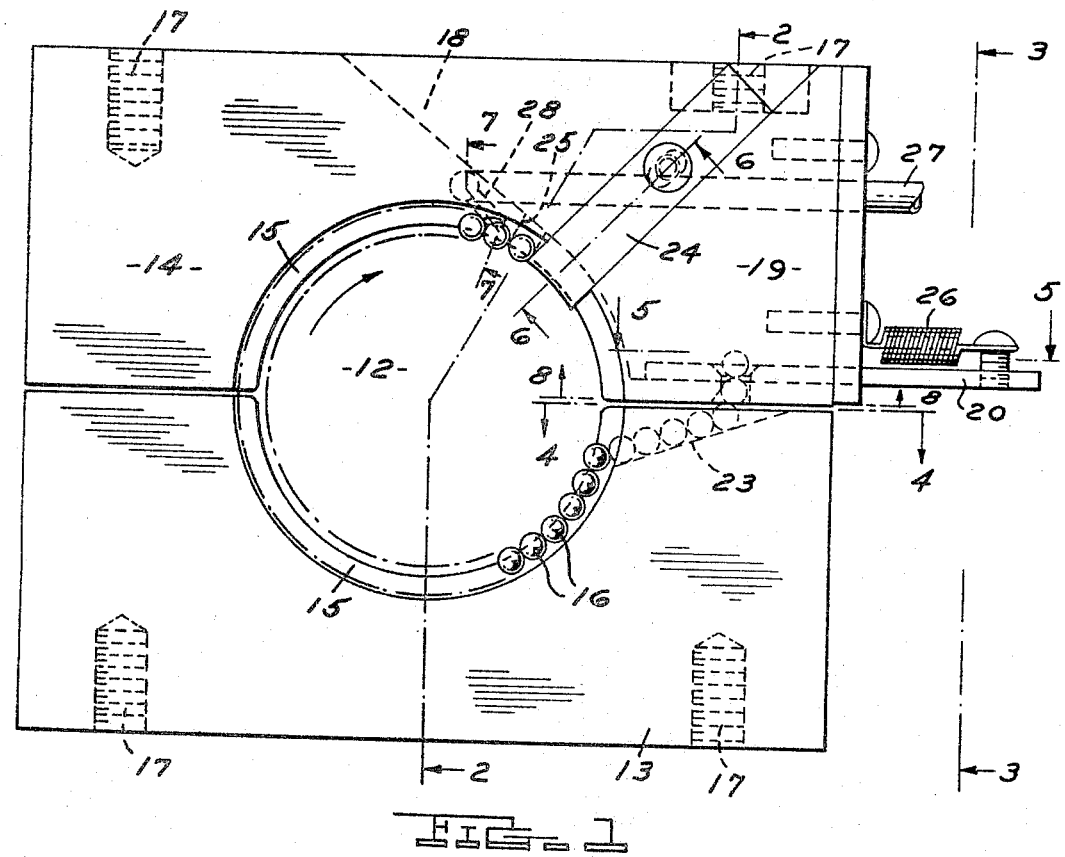
FIG. 1 is an elevation of the burnishing unit taken axially of the shaft.

With reference to FIGS. 1 and 2 it may be seen that a typical burnishing unit for burnishing a pair of shoulder radii 10 at either side of a cylindrical bearing 11 of a shaft 12 comprises a lower shoe 13 and an upper shoe 14, each provided with angular outwardly facing semicircular track segments 15 on either side of the shoe to provide bearing races for a series of balls 16 in effecting a burnishing operation. It will be understood that the respective shoes 13 and 14 are secured by threaded mounting bolt holes 17 to respective stationary and movable heads of a burnishing machine (not shown) which also provides a mounting and rotational drive for the shaft 12 to be burnished. It will be further understood that the shoes may be separated to an open position with the races empty of balls to accommodate insertion of the shaft preparatory to burnishing and withdrawal of the shaft after the burnishing operation is completed, the introduction and emptying of the burnishing balls 16 taking place while the respective shoes 13 and 14 are in their closed position as shown.

Figures 4, 5:
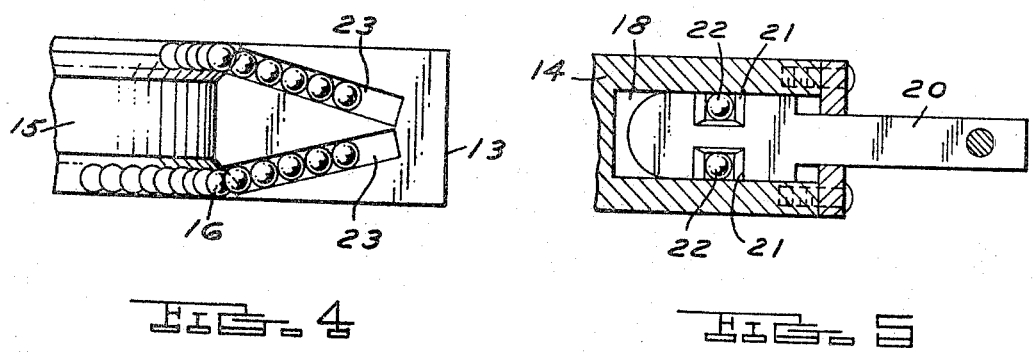
FIG. 4 is a fragmentary plan view of the ball feed passages taken along the line 4—4 of FIG. 1.
FIG. 5 is a fragmentary plan view of a ball release slide taken along the line 5—5 of FIG. 1.

A cavity 18 is provided between two sidewalls 19 at one end of the upper shoe 14 for the storage of burnishing balls, the admission of which to the races 15 is controlled by ball release slide 20 having a pair of openings 21 normally registering with a pair of openings 22 in the bottom of the upper shoe (FIGS. 1, 5 and 8) which communicate with passages 23 formed in the lower shoe (FIG. 4) leading to the respective races 15 on either side of the lower shoe. When the shaft 12 is rotated in a clockwise direction as seen in FIG. 1 the burnishing balls 16 so introduced to the lower shoe are progressively rolled to completely encircle the shaft 12 and effect a desired burnishing action as a result of the interference fit designed between the hardened races 15 of the burnishing shoes and the respective radii 10 of the shaft to be burnished.

A pair of retractable stops 24 mounted in slots in the sidewalls 19 of the upper shoe when in the blocking position shown in FIGS. 1 and 6, serve to divert burnishing balls through a pair of return passages 25 into the ball storage chamber 18 by which means the ball races of the burnishing unit may be emptied by rotation of the shaft 12 with the ball release slide 20 retracted against the return spring 26 to close off communication from the ball storage chamber 18 to the lower shoe passages 23, an air hose 27 leading to air jet passages 28 providing a means for clearing the last of the burnishing balls from the race area into the storage chamber as well as for blowing out any dirt or metal particles before and after the burnishing operation has taken place. The stop 24 optionally may be retracted during the burnishing operation to permit recirculation of the same burnishing balls or may be left in a blocking position to effect the passage of the balls through the storage chamber prior to recirculation the latter alternative providing an opportunity for the balls to cool where the loading and rate of work performed might otherwise unduly raise their temperature. If in this connection or otherwise it were desired to circulate the balls through an outside hopper, it will be understood that return passages similar to 25 could be provided leading to such hopper and that side entry passages could likewise be provided for recirculating the balls to the lower shoe from an outside hopper.

The shoes 13 and 14 may be designed to register against each other when the balls 16, races 15 and shaft 12 are in proper dimensional interference relationship to effect the desired maximum burnishing action which registration would provide a positive stop and limit the degree of burnishing action. Alternatively the shoes may be designed for operation with a slight clearance therebetween with pressure applied to the shoes after the balls are introduced to control the degree of burnishing action. The ball races 15 have been shown as 45° straight conical surfaces adapted to press the balls centrally against a 90° corner radius in the shaft. This will normally provide desired burnishing action where the balls are of a size equal to or very slightly smaller in radius than the finished corner radius of the shaft. However, it will be understood that alternative contours may be provided in such races; for example, a radius form opposed to the radius of the shaft shoulder where, for example, the burnishing load is heavy enough to require a line rather than point contact between the shoe races and balls to avoid excessive unit pressures on the tooling. The races may also be provided with variable angles to cover a desired range of burnishing arc.

It will also be understood while the present typical embodiment illustrates a unit adapted to burnish shaft radii, an equivalent unit can readily be made to burnish internal corner radii which may be incorporated on the inside of rings or tubular shafts.

Thus, while a single typical preferred embodiment of a burnishing unit has been illustrated and described above in detail the foregoing and many other modifications might be resorted to without departing from the scope of the invention as defined in the following claims.

I claim:

1. A ball bearing burnishing unit for burnishing annular corner workpiece radii including a plurality of burnishing ball holding elements separable to a non-operative position for workpiece loading and unloading and closeable to an operative burnishing position, and means for introducing and removing burnishing balls while said elements are in said burnishing position with the workpiece in place.

2. A ball bearing burnishing unit for burnishing annular corner workpiece radii including a plurality of burnishing ball holding elements separable to a non-operative position for workpiece loading and unloading and closeable to an operative burnishing position, and means for introducing and removing burnishing balls while said elements are in said burnishing position with the workpiece in place, said means including a burnishing ball storage chamber, a mechanism for admitting balls from said storage chamber to the burnishing unit adjacent said workpiece radii during rotation of said workpiece relative to said burnishing unit, and mechanism for diverting balls away from said workpiece radii while said admission means is closed upon completion of the burnishing operation.

3. A ball bearing burnishing unit as set forth in claim 2 wherein said last means includes a diverting stop in the path of said burnishing balls.

4. A ball bearing burnishing unit as set forth in claim 2 wherein said last means includes a diverting stop in the path of said burnishing balls, said stop being retractable to permit direct recirculation of said balls.

5. A burnishing unit as set forth in claim 1 including a pair of burnishing ball holding elements separable to a workpiece loading and unloading position as well as closeable to an operative burnishing position, said elements having semi-circular ball races adapted to provide an effective full circular race when said elements are moved to their burnishing position.

6. A shaft burnishing unit comprising a pair of shoes separable to a shaft loading and unloading position and movable together to shaft burnishing position with a rotatable shaft in place, said shoes having semi-circular races adapted to confine burnishing balls within said unit against shaft corner radii to be burnished, and means for introducing and removing burnishing balls to and from the ball spaces between said corner radii and races while said elements are in said burnishing position.

References Cited by the Examiner

FOREIGN PATENTS 98,202 7/1898 Germany.
454,223 2/1928 Germany.

RICHARD H. EANES, JR., *Primary Examiner.*